United States Patent

[11] 3,621,487

[72] Inventor Don Edward Christensen
Indianapolis, Ind.
[21] Appl. No. 837,507
[22] Filed June 30, 1969
[45] Patented Nov. 16, 1971
[73] Assignee RCA Corporation

[54] SEQUENCER
10 Claims, 2 Drawing Figs.

[52] U.S. Cl. ........................................................ 334/11,
328/117, 325/457, 340/168
[51] Int. Cl. ........................................................ H03j 3/04,
H03j 3/06
[50] Field of Search ........................................... 334/11, 13,
26, 18; 328/119; 340/168; 325/171, 459

[56] References Cited

UNITED STATES PATENTS

| | | | |
|---|---|---|---|
| 2,505,029 | 4/1950 | Carbrey ........................ | 328/119 |
| 2,567,944 | 9/1951 | Krause et al. ................. | 328/119 |
| 2,647,996 | 8/1953 | Greenfield ..................... | 328/119 |
| 3,462,695 | 8/1969 | Townsend et al. ............ | 328/119 |
| 3,044,065 | 7/1962 | Barney et al. ................. | 328/48 X |

FOREIGN PATENTS

| | | | |
|---|---|---|---|
| 1,065,907 | 4/1967 | Great Britain ................ | 334/11 |

*Primary Examiner*—Herman Karl Saalbach
*Assistant Examiner*—Saxfield Chatmon, Jr.
*Attorney*—H. Christoffersen

ABSTRACT: A counter, such as a decade counter, coupled to a plurality, such as two, decoders. In the case of a decade counter, each decoder is responsive to not more than ten counts. In response to the last count decoded by one decoder, it is operatively decoupled from the decoder and the next decoder is operatively coupled to the counter. This may be accomplished, for example, by removing power from one decoder and applying it to the other. In addition, in response to this same stimulus, the counter may be reset to its initial counting state.

INVENTOR.
DON E. CHRISTENSEN
BY H. Christoffersen
Attorney

INVENTOR.
DON E. CHRISTENSEN
BY H. Christoffersen
Attorney

SEQUENCER

BACKGROUND OF THE INVENTION

It is well known in the art to use counters and decoders to obtain a number of pulses in sequence. These circuits have such widespread use that many types of binary counters and decade counters are commercially available. In addition, decoders to interface with the aforementioned counters are also available. However, these commercially available circuits come in building blocks of standard size and form. Problems arise in attempting to employ these circuits for some nonstandard application such as producing sequences of say 11–20 pulses having particular characteristics.

While the problem can be solved by designing a special counter and decoder module, this solution often is not practical because the cost is too high. Another possible solution is to use discrete components but this too is expensive and in one practical application requires too much space.

There is available commercially for one particular system, decoders which do provide outputs having the desired characteristics. These decoders are 10 -stage decoders and they interface with a standard decade counter having a binary coded decimal (BCD) output. A single such decoder may be connected to a single counter to produce sequences of 10 pulses. However, producing sequences of say 11–20 pulses is not simple using components such as these. For example, each decoder is only responsive to counts 1 through 10 so that they would be suitable for say the 11th to the 20th counts of two decade counters connected to count from 1 to 100. Connecting two 10-stage decoders to two such decade counters, respectively, does not solve the problem either because the second decade counter counts at only 1/10th the rate of the first decade counter when the two are connected to count from 1 to 100. Thus, for each set of 10 outputs produced by the slower operating decoder, 10 sets of 10 pulses would be produced by the faster operating decoder.

An object of the present invention is to provide a sequencing circuit using a minimum number of standard counter and decoder circuits.

It is another object of the invention to provide a circuit such as described above in which a number of decoder outputs are obtained which is greater than the capacity of the counter used to drive the decoders.

SUMMARY OF THE INVENTION counting means and a plurality of decoders, each decoder responsive to up to the N counts produced by the counting means. One decoder is in operative relationship with the counting means and when it decodes the last count to which it is responsive, the next decoder is placed in operative relationship with the counting means and the first one is removed from said operative relationship.

DETAILED DESCRIPTION OF THE INVENTION

Figure 1:
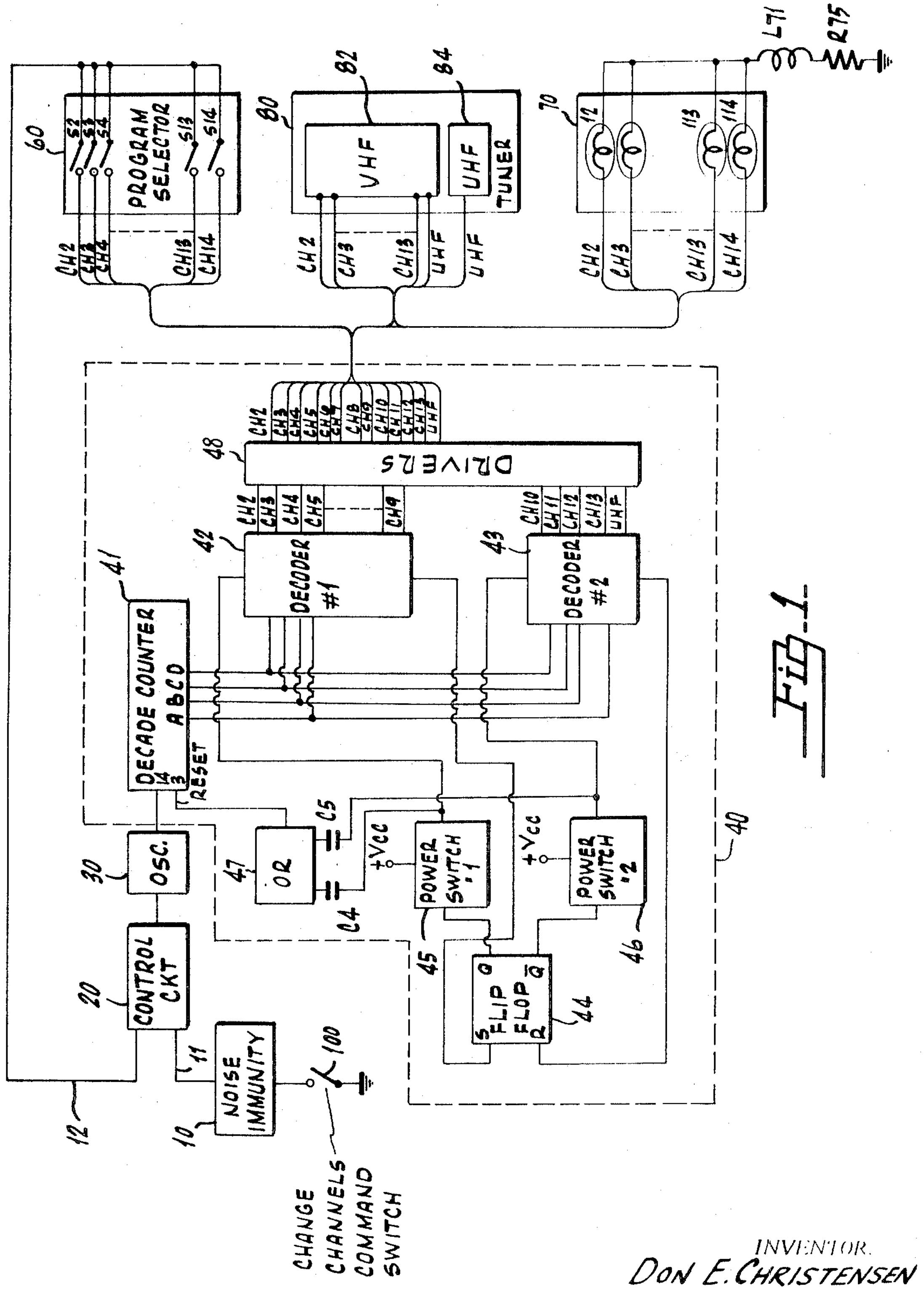
FIG. 1 is a block diagram of an electronically controlled tuner in which sequencing means embodying the invention are used.

The present invention permits the effective counting capacity of standard size counters and decoders to be increased. For example, using a commercially available decade counter (which counts only from 1 to 10) and two commercially available decoders, each responsive only to the same counts 1 to 10, it is possible to decode any number from 1 to 20. In the system of FIG. 1, the use of such an arrangement is illustrated to control channel selection in an electronically controlled television receiver.

In the system of FIG. 1, the tuner 80 and in conjunction therewith the bank of indicator lamps 70 and the bank of program selector switches 60 are electronically controlled. Each signal applied to a channel of the tuner is also applied to the indicator lamp corresponding to that channel and to the program selector switch corresponding to that channel.

The tuner section 80 shown in FIG. 1 includes a VHF section 82 and a UHF section 84. The VHF tuner has 12 terminals, each corresponding to a different one of the channels from 2 to 13. In the preferred embodiment, the VHF tuner has 12 tuned circuits (not shown) each of which is coupled to a different one of the 12 terminals. It should be noted that the VHF tuner could, for example, also comprise a single circuit which could be tuned to different frequencies by means of different voltage levels applied to the various terminals. In the preferred embodiment however, each of the 12 tuned circuits is individually and separately selected when a signal of sufficient amplitude is applied to its tuner terminal. Since a potential applied to one of the terminals causes the video information of the channel coupled thereto to be displayed, it is clear that only one terminal may receive such a potential at any one time.

The UHF tuner 84 is treated for the purpose of this application as another channel and may be selected like any of the VHF channels. However, as there are a great many stations in the UHF region, in the particular embodiment chosen for illustration, UHF station selection is achieved by means of an additional continuous control (not shown) which tunes the receiver to those UHF stations in conventional fashion. It is to be understood of course, that the UHF tuner can instead be treated like the VHF tuner, that is, it may have a plurality of input terminals, each corresponding to a different UHF station, and tuned electronically in the same manner as the VHF channels, as discussed below.

Corresponding to each channel there is a program selector switch. These switches (S2 through S14) are closed in advance by the viewer, for example when the set is first installed or even just before sitting down to view several television programs on different channels, to the channels he desires automatically to be selected and displayed. These switches, when closed, provide a path for a feedback signal which stops the receiver at the preselected channels.

Corresponding to each channel there is also an indicator lamp. These indicator lamps (I2 through I14) are lit whenever the corresponding channel is displayed.

The tuner 80, the program selector switches 60 and the bank of indicator lamps 70 are operated in parallel, but it should be obvious that they could also be operated in series, or partly in series and partly in parallel the only criteria for the mode of operation being reliability and ease of connection and assembly.

In the operation of the system in response to a viewer generated command to change channels, the receiver passes the channels not of interest, without displaying them, and stops only when it reaches the next preselected channel. The means for accomplishing this includes a sequencing means comprising the oscillator 30 and the associated counting circuits, and which in response to the change channel command sequentially energizes, one at a time, a tuner terminal and the corresponding channel coupled thereto. When a channel which has been preselected is reached, that is, when a pulse is applied to the tuner terminal for a channel whose program selector switch is closed, a feedback signal is produced which prevents the sequencing means from advancing to the next channel, so that the preselected channel is displayed.

The change-channel switch 100, which is activated by the viewer whenever he wants to change channels, is connected to a noise immunity and pulse shaping circuit 10. The noise immunity circuit removes contact bounce generated by the switch closure and in response to a switch closure of given duration provides a single relatively smooth "start oscillation" pulse on line 11 which is fed to control section 20. The control section 20, when energized by the "start oscillation" pulse allows pulses from oscillator 30 to be fed to a decade counter represented by block 41. Once enabled the oscillator supplies pulses to counter 41 until a feedback pulse is applied to line 12 inhibiting the further application of pulses to the counter.

The decade counter is part of the counting means 40 whose function is to provide, in response to pulses from the oscillator, output signals which are capable of sequentially energizing the channels of the tuner 80 as well as the corresponding lines connected to the program selector switches 60 and to the bank of indicator lamps 70.

Figure 2:
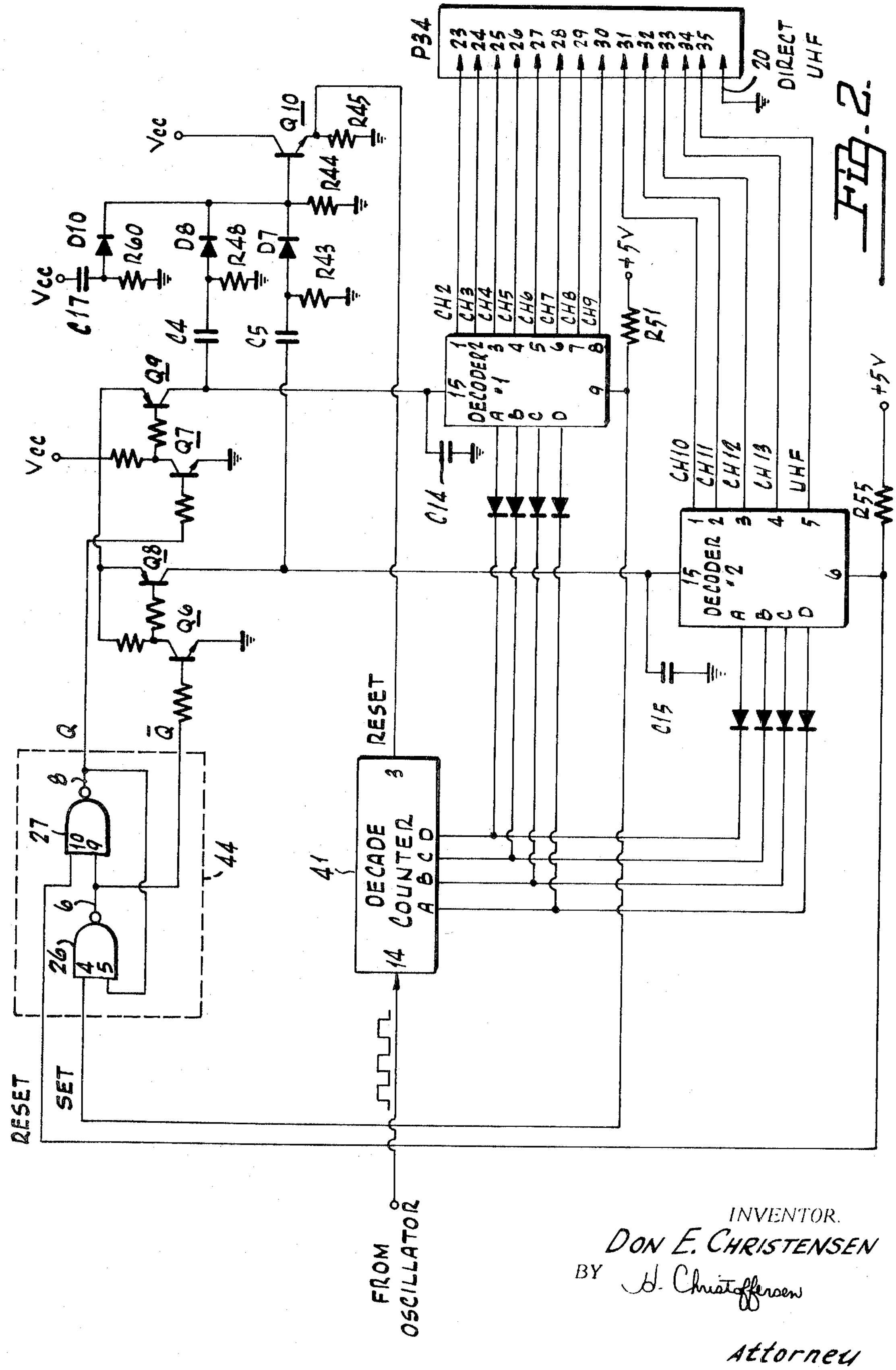
FIG. 2 is a schematic diagram showing an embodiment of the invention.

In order to minimize components and power and to use presently available integrated circuits the combination shown in FIG. 1 and further detailed in FIG. 2 is used. The counter 41 is wired to provide 10 counts (0–9) in binary coded decimal (BCD) format. The counter has four outputs denoted by the letters A, B, C, and D having respectively the weights of 1, 2, 4, and 8. The counter is automatically reset after the tenth count or by a pulse from the output of "OR"-gate 47. The counter's four outputs are fed in parallel to decoder 1, represented by block 42, and decoder 2, represented by block 43. Decoders 1 and 2 are well known binary coded decimal converters (BCD to decimal decoders). Each decoder has 10 outputs and each decoder output uniquely represents one count of the 10 counts.

It should be noted that each decoder is returned by means of a power switch to the $V_{CC}$ line. Thus, decoder 2 is coupled to $+V_{CC}$ by power switch 2 represented by block 46 and decoder 1 is coupled to $+V_{CC}$ by power switch No. 1 represented by block 45. Power switch 1 receives the Q output of flip-flop 44 and power switch 2 receives the complementary output $\overline{Q}$ of the flip-flop 44. The decoder 42 connects to the set terminal S of the flip-flop and decoder 43 connects to the reset terminal R of the flip-flop. The power switches 1 and 2 are AC coupled by capacitors C4 and C5 to OR-gate 47. This ensures that every time power switch 1 or power switch 2 is energized, a reset pulse is fed to the counter, resetting the latter to its zero count.

The operation of the counting means is best understood by first assuming that the set-reset flip-flop 44 is reset (i.e., Q is "-high" and $\overline{Q}$ is "low") so that power switch 1 is turned on and power switch 2 is not energized. Under these conditions, decoder 1 has power applied thereto while decoder 2 has no power applied thereto.

Pulses applied to counter 41 cause signals to appear on lines A, B, C, and D, which are decoded by decoder 1 and appear as sequentially spaced pulses on its output lines. (Note that only eight decoded outputs are needed to produce the control signals for channels 2 through 9. In other words, the eight counts 0000,0001—0111, produced in response to the reset pulse, which produces count 0000, and seven pulses following the reset pulse, correspond to the decoder outputs for channels 2 through 9 respectively.) When decoder 1 decodes the ninth count (1000) from the counter (in response to the eighth input pulse following the reset pulse) it sets the flip-flop forcing Q to go low and $\overline{Q}$ to go high. This, in turn, removes power from decoder 1 and applies power to decoder 2. Simultaneously, in response to $\overline{Q}$ going high, a reset pulse is fed to the decade counter via OR-gate 47, resetting the latter. The counter output is now decoded by decoder 2 which is also capable of providing 10 output pulses. (Note that when the counter is reset and decoder 2 is energized, the initial position of the counter corresponds uniquely to the decoded output for channel 10.) Since only five of the 10 outputs from decoder 2 are necessary to energize the remaining five tuner channels, the flip-flop is reset after the fifth count out of decoder 2.

It should be noted that the last count decoded by the first decoder before the second decoder is gated on and the counter is reset is the count of nine and that the last count decoded by the second decoder before the first decoder is gated on is the sixth count. It should be clear that these were arbitrarily chosen and that generally the last count decoded by the decoders may be any of the counts from one through 10.

By using alternately gated power switches to apply power to the two decoders, it is possible to obtain 2N decoded outputs from a counter arranged to have N counts, where N is an integer greater than 1. The decoder outputs are coupled through buffer stages represented by block 48 which level shifts the ground to $+V_{CC}$ level signals to a $+V_{DD}$ level which is typically 30 volts. There are 13 buffer stages and each output of the buffer stage drives a channel of the tuner, and corresponding to that channel an indicator lamp and a program selector switch.

The automatic selection process provided by the system may now be explained by an example in which it will be assumed that the viewer wishes to see only channel 2 or channel 13. Switch S2 and switch S13, corresponding to channels 2 and 13 respectively are closed, and the remaining switches are kept open. It will be further assumed that prior to depressing switch 100, power is present and channel 2 is being displayed. Activating switch 100 causes the control section to enable the oscillator, which supplies pulses to the counter. After the first pulse, the counter, which was at the counter position corresponding to channel 2, advances by one count. This generates a pulse at the output marked channel 3 of decoder 1. Since power has been removed from the line corresponding to channel 2, indicator light I2 goes off. Channel 3 is momentarily energized. However, as its program selector switch S3 is open, no signal is fed back to the control section. Therefore, the oscillator continues to operate, and its next output pulse causes the counter to advance by 1. The pulse is removed from the channel 3 terminal of the decoder 42 and the new count causes a pulse to be applied at its channel 4 terminal.

As the duration of the pulse applied to the channel 3 terminal is short, and as an inductive network is connected in series with the lamps to slow their response, the indicator light for channel 3 does not light up with sufficient intensity or for a sufficient length of time to be visible to the viewer. As for the audio and video signals of the momentarily energized circuits, a muting circuit, described later, prevents audio and video display while the oscillator is enabled.

The oscillator continues to provide pulses to the counter which are decoded by decoder 1 until channel 9 is reached and which are then decoded by decoder 2 until channel 12 is reached. The next pulse causes the channel 13 terminal to be energized. As the corresponding selector switch S13 is closed, a feedback pulse is applied via line 12 to the control circuit 20. This pulse disables the oscillator and prevents the further application of pulses to the counter. The counter is thus stopped at the count corresponding to the decoded output which is fed to the channel 13 line. The tuned circuit corresponding to channel 13 is turned on, indicator lamp I13 corresponding to channel 13 is on and remains on so long as switch 100 is not again activated.

The system thus presents the means for electronically and automatically selecting preselected channels requiring no moving parts.

The detailed operation of the counter circuit discussed briefly above is best understood by referring to FIG. 2. Following the closure of switch 100, a pulse going from high to low is applied to the decade counter 41 causing its output to change. The decade counter has four outputs labeled A, B, C, and D. These outputs, given the weight of 1, 2, 4, and 8 respectively, present the output in what is usually referred to as binary coded decimal (BCD) form. (The first pulse is thus represented by 0000, the second by 0001, the third by 0010 and so on.) The output thus advances by 1 count each time a pulse applied to the input of the decade counter makes a transition from the high level to the low level.

The four outputs of the counter are connected through diodes to the corresponding four inputs of decoder 1 and decoder 2 which are also marked A, B, C, and D. Decoders 1 and 2 are of similar construction. Each decoder has 10 outputs and each output is the uncommitted collector of an NPN grounded emitter transistor, i.e., there is no pull up resistor between the collector and $+V_{CC}$. Thus, when a decoder output is not energized, a high impedance is presented at that decoder output and when the decoder output is energized there is a very low impedance connecting that decoder output to ground.

Each decoder produces a single switch closure for a given combination of BCD information. Thus, with the decoders alternately enabled and each decoder connected to the counter, 20 pulses sequentially spaced in time and appearing one at a time at each of 20 outputs are available. But, since there are only 13 channels which have to be energized, decoder 1 is arbitrarily chosen to provide 8 decoded outputs each of which is coupled to a different one of the channels from 2 through 9 and decoder 2 is arbitrarily chosen to provide 5 decoded outputs, each of which is coupled to a different one of the channels from 10 through 13 and to the UHF channel.

In addition to the 13 outputs used to drive the tuner, the ninth output of decoder 1 is coupled to the set side of flip-flop 44 and the sixth output of decoder 2 is coupled to the reset side of flip-flop 44. The ninth output of decoder 1 and the sixth output of decoder 2 are coupled through resistors R51 and R55 respectively to provide a "high" signal to the set and reset terminals until the corresponding outputs are energized.

Decoders 1 and 2 have their power input pin connected to $+V_{CC}$ by means of the collector to emitter path of transistors Q9 and Q8 respectively. The emitters of Q8 and Q9 are connected to $+V_{CC}$ while the base of transistor Q8 is connected to the collector of transistor Q6 and the base of transistor Q9 is connected to the collector of transistor Q7. The combination of transistors Q6 and Q8 and the combination of transistors Q7 and Q9 form two complementary NPN–PNP power switches which were represented in the block diagram by blocks 46 and 45 respectively. The base of transistor Q6 is connected to the $\overline{Q}$ side of flip-flop 44 and the base of transistor Q7 is connected to the Q side of flip-flop 44.

Flip-flop 44 consists of two two-input NAND-gates 26 and 27 which are cross coupled to form a set-reset bistable multivibrator. The set side (terminal 4 of NAND-gate 26) is connected to the tenth output of decoder 1 which is connected through resistor R51 to $+V_{CC}$. The reset side of flip-flop 44 (terminal 10 of NAND-gate 27) is connected to the sixth output of decoder 2, which is connected through resistor R55 to $+V_{CC}$. Terminal 5 of NAND-gate 26 is connected to terminal 8 (Q) of NAND-gate 27 and terminal 6 of NAND-gate 26 ($\overline{Q}$) is connected to terminal 9 of NAND-gate 27.

Assuming Q to be high (and therefore $\overline{Q}$ low) a positive voltage is applied to the base of Q7 turning it on and thereby driving Q9 into saturation. This applies $+V_{CC}$ to pin 15 of decoder 1 while decoder 2 is disconnected from $+V_{CC}$. Eight outputs are arbitrarily taken from decoder 1 and the ninth count is used to apply a grounding signal to the set side (terminal 4 of NAND-gate 26) of flip-flop 44. Grounding the set side causes terminal 6 ($\overline{Q}$) of NAND-gate 26 and terminal 9 of NAND-gate 27 to go high. Since terminal 10 of NAND-gate 27 which is connected through resistor R55 to $+V_{CC}$ is also high and the voltage at the Q goes to ground locking the flip-flop in this stable state (i.e., Q≈zero volts, $\overline{Q}$≈to $+V_{CC}$).

With $\overline{Q}$ equal to $+V_{CC}$, transistor Q6 will be turned on, in turn driving Q8 into saturation. Q8 now clamps pin 15 of decoder 2 to $+V_{CC}$ while Q9 which is turned off opens the connection between terminal 15 of decoder 1 and $+V_{CC}$. Thus, power has effectively been switched from decoder 1 which is now "unpowered" and whose outputs are now floating, to decoder 2 which is now set to decode the outputs of the decade counter. Decoder 2 is selected to decode 5 counts out of the counter and on the sixth count a ground signal is applied to the reset side of flip-flop 44 causing Q to go high and $\overline{Q}$ to go low. This switches power back to decoder 1 and cuts off power to decoder 2.

It should be noted that capacitor C14 connected between terminal 15 of decoder 1 and ground and capacitor C15 connected between terminal 15 of decoder 2 and ground are used to maintain power on the decoders during the transition phase of the power switching.

Having analyzed the operation of the counter and decoders and having shown how sequential output signals are produced in response to pulses from the oscillator, it now remains to be seen how the decade counter is reset. First, the decade counter can reset itself after the count of 10 even though in the present example it does not reach that count before being reset by one of the power switches. In addition, the decade counter is reset every time one of the power switches is energized (i.e., every time Q8 or Q9 goes on) and every time the logic level potential ($+V_{CC}$) is applied to the system. This assures that the decade counter always returns to the first position (channel 2) when the television receiver is first plugged into the power line.

Terminal 3 of counter 41 is the counter terminal to which a positive signal is applied to reset the counter. It is connected to emitter follower transistor Q10 whose base is coupled to what may be described as a three-input "OR" circuit.

One input comes from diode D10 whose anode is connected to the junction of capacitor C17 and resistor R60. C17 and R60 form a differentiating network which generates a positive pulse into the base of Q10 whenever $V_{CC}$ is applied to this differentiating circuit. This ensures that the system will always be turned to channel 2 when $+V_{CC}$ is first generated in the receiver.

The other two inputs come from diodes D7 and D8 which couple into the base of Q10 the positive pulse generated by differentiating networks C4 and R48 and C5 and R43 respectively. C4 is connected between the collector of Q9 and the anode of diode D8 and C5 is connected between the collector of Q8 and the anode of diode D7. These networks reset the counter each time power is switched to the decoders. Q10 thus takes the positive spikes applied to its base and generates an in-phase signal of sufficient magnitude to reset the decade counter.

It has thus been shown that a counter of 10 may be used to yield many more than 10 uniquely defined decoded outputs by means of more than one decoder, which are enabled one at a time. This scheme may be extended by using many decoders each coupled to the counter and each energized when the preceding decoder is turned off. While in the specific embodiment illustrated, counter 41 is a decade counter and decoders 1 and 2 have 10 stages each, it is to be understood other forms of counters and decoders may be employed.

It should be appreciated that the circuit provides a means of minimizing the number of components necessary to perform a given counting and decode function.

Thus, for example, in the prior art to count to 16 requires a four-stage binary counter and to decode each count may require one inverter gate per counter stage to generate the complement of each stage output and at least 16 decode gates each of which is responsive to a different count. Note also that the count information is carried on four lines and that therefore the information from four lines has to be decoded.

Performing the same counting and decode function using the teachings of the invention requires only a three-stage binary counter and two sets of eight decode gates in addition to bistable controlled switch means to alternately gate power to the decoders. Thus, though 16 decode gates are still needed, it is important to note that the count information of a three-stage counter is carried on three lines and that therefore the eight decode gates only need three inputs per decode gate.

It should also be clear that it is within the scope of the invention to employ switching means to couple the set of counter signal lines from decoder to decoder rather than removing power from the decoder to effectively remove it from the circuit.

What is claimed is:

1. In combination:

a single counting means responsive to input signals for repeatedly producing N counts, each count corresponding to a different number of such signals, where N is an integer;

a plurality of decoders, each having a plurality of output terminals, each decoder, when in operative relationship with said counting means, responsive to up to N of said counts for producing, in response to each different count, a signal on a different one of its output terminals, only one of said decoders being in operative relationship with said counting means; and means responsive to the last count decoded by said one decoder for placing a second decoder in operative relationship with said counting means and removing said one decoder from said operative relationship.

2. In the combination as set forth in claim 1, further including:

means responsive to the last count decoded by each decoder for resetting said counting means to a predetermined count.

3. In the combination as set forth in claim 1, the number of said decoders being equal to two, and further including:

means responsive to the last count decoded by the second decoder for placing the first decoder in operative relationship with said counting means and removing said second decoder from said operative relationship.

4. In the combination as set forth in claim 1, said last-named means comprising a flip-flop.

5. In the combination as set forth in claim 1, said last-named means comprising means for removing power from said one decoder for disabling the same and for applying power to the second decoder.

6. The combination of:

an electronically tunable television tuner having a plurality of channels, each channel having a terminal adapted to receive a selection signal;

a decade counter;

two 10-stage decoders, each responsive to a group of up to 10 counts and in the range one to 10, where each group need not include the same number of counts, only the first said decoder being in operative relation with said decade counter, each decoder having a plurality of output terminals, each such terminal being connected to different ones of said tuner terminals for supplying a selection signal to that terminal;

means responsive to the decoding by said first decoder of the last count to which said first decoder is responsive for placing the second decoder in operative relationship with said counter, resetting said counter, and removing said first decoder from said operative relationship;

means responsive to the decoding by said second decoder of the last count to which the second decoder is responsive for placing the first decoder in operative relationship with said counter, resetting said counter, and removing said second decoder from said operative relationship;

program selection means for selecting from among said plurality of channels the ones desired for viewing; and means responsive to the production by either one of said decoders of a selection signal for a channel called for by said program selection means for maintaining that decoder producing said selection signal.

7. In the combination as set forth in claim 6, said means for removing a decoder from operative relationship with said counter comprising means for removing power from said decoder.

8. The combination comprising:

a counter responsive to input signals for producing N counts. each count corresponding to a different number of such input signals, where N is an integer;

M decoders, where M is an integer greater than 1, each decoder having inputs adapted to receive the counts produced by said counter, and having outputs for producing up to N separate decoded outputs;

means for coupling the inputs of said M decoders in parallel to the outputs of said counter;

means for applying power to one of said M decoders at a time for rendering one of said decoders operative at a time; and means responsive to the last count decoded by a powered decoder for deenergizing said powered decoder and for energizing another one of said M decoders, for producing up to M times N (MXN) decoded outputs from said N counter.

9. The combination as claimed in claim 8 wherein M equals 2; wherein said means for applying power to said decoders includes a switch in series with each decoder, and a flip-flop, wherein said switches are connected to a different one of the two complementary outputs of a flip-flop, whereby only one of said two switches is enabled at any one time; and wherein the set and reset inputs of said flip-flop are connected to a different one of the last decoded outputs of said decoders, whereby the decoders determine the state of the flip-flop.

10. The combination as set forth in claim 6. wherein said last-named means comprises means for preventing said decade counter from advancing to a new count.